United States Patent
Nagase et al.

(10) Patent No.: US 10,261,522 B2
(45) Date of Patent: Apr. 16, 2019

(54) PRESSURE-TYPE FLOW RATE CONTROL DEVICE

(71) Applicant: FUJIKIN INCORPORATED, Osaka (JP)

(72) Inventors: Masaaki Nagase, Osaka (JP); Kaoru Hirata, Osaka (JP); Ryousuke Dohi, Osaka (JP); Kouji Nishino, Osaka (JP); Nobukazu Ikeda, Osaka (JP)

(73) Assignee: FUJIKIN INCORPORATED, Osaka (JP)

( * ) Notice: Subject to any disclaimer, the term of this patent is extended or adjusted under 35 U.S.C. 154(b) by 196 days.

(21) Appl. No.: 15/327,592

(22) PCT Filed: Jul. 9, 2015

(86) PCT No.: PCT/JP2015/003474
§ 371 (c)(1),
(2) Date: Jan. 19, 2017

(87) PCT Pub. No.: WO2016/013172
PCT Pub. Date: Jan. 28, 2016

(65) Prior Publication Data
US 2017/0212531 A1    Jul. 27, 2017

(30) Foreign Application Priority Data

Jul. 23, 2014 (JP) ................................ 2014-149623

(51) Int. Cl.
G05D 7/06 (2006.01)
(52) U.S. Cl.
CPC ........ G05D 7/0635 (2013.01); *Y10T 137/776* (2015.04)
(58) Field of Classification Search
CPC .. G05D 7/06; Y10T 137/776; Y10T 137/7762
(Continued)

(56) References Cited

U.S. PATENT DOCUMENTS 5,669,408 A    9/1997    Nishino et al.
5,791,369 A    8/1998    Nishino et al.
(Continued)

FOREIGN PATENT DOCUMENTS

JP    H08-338546 A    12/1996
JP    2003-195948 A    7/2003
(Continued)

OTHER PUBLICATIONS

International Search Report issued in PCT/JP2015/003474; dated Aug. 4, 2015.

*Primary Examiner* — Kevin Lee
(74) *Attorney, Agent, or Firm* — Studebaker & Brackett PC

(57) ABSTRACT

The pressure-type flow controller includes a main body provided with a fluid passage, a control valve for pressure control fixed in a horizontal position to the main body, an on/off valve fixed in a vertical position to the main body on the downstream side of the control valve for pressure control, an orifice provided in the fluid passage on the upstream side of the on/off valve, and a pressure sensor fixed to the main body for detecting the internal pressure of the fluid passage between the control valve for pressure control and the orifice. The fluid passage includes a first passage portion in a horizontal position connected to the control valve for pressure control, a second passage portion in a vertical position connecting the first passage portion to the orifice, and a third passage portion in a horizontal position connecting the second passage portion to the pressure sensor.

14 Claims, 10 Drawing Sheets

(58) Field of Classification Search
USPC .............................................. 137/486, 487.5
See application file for complete search history.

(56) References Cited

U.S. PATENT DOCUMENTS

| | | | | |
|---|---|---|---|---|
| 8,205,635 B2 * | 6/2012 | Igarashi | .................... | G01F 1/42 |
| | | | | 137/486 |
| 8,225,814 B2 * | 7/2012 | Igarashi | .............. | F16K 37/0066 |
| | | | | 137/338 |
| 8,573,247 B2 * | 11/2013 | Ushigusa et al. | ......... | G01F 1/36 |
| | | | | 137/486 |
| 2004/0204794 A1 | 10/2004 | Ohmi et al. | | |
| 2014/0299201 A1 | 10/2014 | Hirose et al. | | |

FOREIGN PATENT DOCUMENTS

| | | | |
|---|---|---|---|
| JP | 3522535 B2 | 4/2004 |
| JP | 2006-330851 A | 12/2006 |
| JP | 4137267 B2 | 8/2008 |
| JP | WO2013/046660 A1 | 4/2013 |
| JP | 5430007 B2 | 2/2014 |
| WO | 03/058363 A1 | 7/2003 |

* cited by examiner

PRESSURE-TYPE FLOW RATE CONTROL DEVICE

TECHNICAL FIELD

The present invention relates to the improvement of a pressure-type flow controller interposed in a fluid supply line of a semiconductor manufacturing device or the like to control the flow rate of a fluid (gas). It particularly relates to a pressure-type flow controller having enhanced shutoff response characteristics, thereby allowing for significant enhancement of the operation performance of a source gas supply device for a semiconductor manufacturing device or the like.

BACKGROUND ART

Conventionally, in source gas supply devices for semiconductor manufacturing devices and the like, thermal type flow controllers and pressure-type flow controllers have been widely used for controlling the supplied gas flow. In particular, a pressure-type flow controller FCS shown in FIG. 8 is composed of a control valve for pressure control CV, a temperature detector T, a pressure sensor P, an orifice OL, a computation control unit CD including a temperature correction/flow computation circuit CDa, a comparison circuit CDb, an input/output circuit CDc, an output circuit CDd, etc., and has the excellent flow characteristic that stable flow control can be performed even when the primary-side supply pressure is significantly changed.

That is, in the pressure-type flow controller FCS of FIG. 8, values detected at the pressure sensor P and the temperature detector T are input to the temperature correction/flow computation circuit CDa, where the detected pressure is subjected to temperature correction and flow computation, and then the flow computation value Qt is input to the comparison circuit CDb. In addition, an input signal Qs corresponding to the set flow is input from the terminal In and then input to the comparison circuit CDb through the input/output circuit CDc, where the signal is compared with the flow computation value Qt from the temperature correction/flow computation circuit CDa. As a result of the comparison, in the case where the input signal Qs corresponding to the set flow is smaller than the flow computation value Qt, a control signal Pd is output to the actuator of the control valve CV. Accordingly, the control valve CV is actuated in the closing direction, and actuated toward the valve-closing direction until the difference between the input signal Qs corresponding to the set flow and the computed flow value Qt (Qs−Qt) reaches zero.

In the pressure-type flow controller FCS, when a so-called critical expansion condition of $P_1/P_2 \geq$ approximately 2 is maintained between the pressure $P_2$ on the downstream side and the pressure $P_1$ on the upstream side of the orifice OL, the gas flow Q through the orifice OL is as follows: $Q=KP_1$ (wherein K is a constant). Meanwhile, when the critical expansion condition is not satisfied, the gas flow Q through the orifice OL is as follows: $Q=KP_2{}^m(P_1-P_2)^n$ (wherein K, m, and n are constants).

Therefore, excellent characteristics can be exerted as follows. That is, the flow Q can be accurately controlled by controlling the pressure $P_1$. Further, even when there is a significant change in the pressure of the gas Go on the upstream side of the control valve CV, the controlled flow value hardly changes.

Parenthetically, pressure-type flow controllers designed as such that the gas flow Q is computed as $Q=KP_1$ (wherein K is a constant) are sometimes called FCS-N type, while pressure-type flow controllers designed such that the gas flow Q is computed as $Q=KP_2{}^m(P_1-P_2)^n$ (wherein K, m, and n are constants) are sometimes called FCS-WR type.

Further, in addition to them, pressure-type flow controllers of this kind also include those called FCS-SN type and FCS-SWR type. FCS-SN type uses, as an orifice of the above FCS-N type, an orifice mechanism including a plurality of orifices OL connected in parallel such that a gas is allowed to flow through at least one orifice by a switching valve, such as an orifice mechanism including two orifices connected in parallel and a switching valve provided on the inlet side of one orifice such that the flow control range can be changed by opening/closing the switching valve. FCS-SWR type uses the same orifice mechanism as an orifice of the above FCS-WR type.

Parenthetically, with respect to the pressure-type flow controllers of FCS-N type, FCS-SN type, FCS-WR type, and FCS-SWR type described above, their own configurations, operation principles, and the like are already known, thus the detailed description thereof is omitted herein (JP-A-8-338546, JP-A-2003-195948, etc.).

In addition, as pressure-type flow controllers FCS, as shown in FIGS. 9(a) to (d), the following types exist: a pressure-type flow controller FCS configured as shown in (a) for a gas fluid under critical conditions (hereinafter referred to as FCS-N type; JP-A-8-338546, etc.); (b) FCS-WR type for both a gas fluid under critical conditions and a gas fluid under non-critical conditions (JP-A-2003-195948, etc.); (c) flow-switch FCS-SN type for a gas fluid under critical conditions (JP-A-2006-330851, etc.); and (d) flow-switch FCS-SWR type for both a gas fluid under critical conditions and a gas fluid under non-critical conditions (Japanese Patent No. 5430007, etc.)

Parenthetically, in FIG. 9, $P_1$ and $P_2$ are pressure sensors, CV is a control valve, OL is an orifice, $OL_1$ is a small-diameter orifice, $OL_2$ is a large-diameter orifice, and ORV is an orifice switching valve.

However, in a pressure-type flow controller FCS of this kind, because an orifice OL having a fine bore diameter is used, the gas replaceability is low. Thus, in the case where the control valve for pressure control CV of the pressure-type flow controller FCS is closed to open the output side, it takes a long period of time to exhaust the gas in the space part between the control valve CV and the orifice OL, leading to a problem in that the so-called gas shutoff responsiveness is extremely low.

On the other hand, in the pressure-type flow controller FCS, in order to enhance the shutoff response characteristics, it has been attempted to make the internal volume of the fluid passage between the control valve CV and the orifice OL as small as possible.

FIG. 10 shows an example of such a pressure-type flow controller. In this pressure-type flow controller, the fluid flow direction in a control valve for pressure control 40 is reversed from an ordinary control valve for pressure control 40, so that the fluid (gas) flows in through the gap between the outer periphery of a metal diaphragm valve body 41 and the bottom surface of a valve chamber and flows out from the center of a valve seat 42, thereby allowing for the reduction of the internal volume of the fluid passage. In addition, an orifice 43 is incorporated into an on/off valve 44, thereby allowing for the reduction of the internal volume between the orifice 43 and the on/off valve 44. By such internal volume reduction, the improvement of shutoff characteristics is to be achieved (Japanese Patent No. 3522535, Japanese Patent No. 4137267).

Parenthetically, in FIG. 10, 45 is a main body, 46 is a fluid inlet, 47 is a fluid outlet, 48 is a pressure sensor, 49 is a control panel, 50 is a first fluid passage in a vertical position connecting the control valve for pressure control 40 and a pressure sensing chamber on a pressure sensing surface of the pressure sensor 48, 51 is a second fluid passage in a horizontal position connected to the first fluid passage 50, and 52 is a third fluid passage in a vertical position connecting the second fluid passage 51 and the orifice 43.

However, even with the pressure-type flow controller shown in FIG. 10, it is difficult to significantly improve the shutoff response characteristics, and the problem of poor shutoff response characteristics in conventional pressure-type flow controllers still left unsolved.

CITATION LIST

Patent Literature

Patent Literature 1: JP-A-8-338546
Patent Literature 2: JP-A-2003-195948
Patent Literature 3: JP-A-2006-330851
Patent Literature 4: Japanese Patent No. 5430007
Patent Literature 5: Japanese Patent No. 3522535
Patent Literature 6: Japanese Patent No. 4137267

SUMMARY OF INVENTION

Technical Problem

The present invention is aimed at solving the problems of conventional pressure-type flow controllers as described above, and a main objective thereof is to improve shutoff responsiveness in flow control, that is, to provide a pressure-type flow controller capable of further shortening the shutoff time in flow control.

Solution to Problem

In order to achieve the above objective, a first aspect of the pressure-type flow controller according to the present invention includes: a main body provided with a fluid passage communicating between a fluid inlet and a fluid outlet; a control valve for pressure control fixed in a horizontal position to the main body for opening/closing the fluid passage; an on/off valve fixed in a vertical position to the main body for opening/closing the fluid passage on the downstream side of the control valve for pressure control; an orifice provided in the fluid passage on the upstream side of the on/off valve; and a pressure sensor fixed to the main body for detecting the internal pressure of the fluid passage between the control valve for pressure control and the orifice, the fluid passage including: a first passage portion in a horizontal position connected to the control valve for pressure control; a second passage portion in a vertical position connecting between the first passage portion and the orifice; and a third passage portion in a horizontal position connecting between the second passage portion and the pressure sensor.

A second aspect of the pressure-type flow controller according to the present invention includes: a main body provided with a fluid passage communicating between a fluid inlet and a fluid outlet; a control valve for pressure control fixed in a horizontal position to the main body for opening/closing the fluid passage; an on/off valve fixed to the main body to be opposed to the control valve for pressure control for opening/closing the fluid passage on the downstream side of the control valve for pressure control; an orifice provided in the fluid passage on the upstream side of the on/off valve; and a pressure sensor fixed to the main body for detecting the internal pressure of the fluid passage between the control valve for pressure control and the orifice;

the fluid passage including: a horizontal passage portion connecting between the control valve for pressure control and the orifice; and a vertical passage portion connecting between the horizontal passage portion and the pressure sensor.

A third aspect of the pressure-type flow controller according to the present invention includes: a main body provided with a fluid passage communicating between a fluid inlet and a fluid outlet; a control valve for pressure control fixed in a horizontal position to the main body for opening/closing the fluid passage; an on/off valve fixed to the main body to be opposed to the control valve for pressure control for opening/closing the fluid passage on the downstream side of the control valve for pressure control; an orifice provided in the fluid passage on the upstream side of the on/off valve; and a pressure sensor fixed to the main body for detecting the internal pressure of the fluid passage between the control valve for pressure control and the orifice;

the fluid passage including: a fourth passage portion connecting between the control valve for pressure control and a pressure sensing chamber on a pressure sensing surface of the pressure sensor; and a fifth passage portion spaced from the fourth passage portion and connecting between the pressure sensing chamber and the orifice.

A fourth aspect of the pressure-type flow controller according to the present invention is characterized in that in the first aspect, the second aspect, or the third aspect, the on/off valve and the orifice are formed as an orifice-built-in valve having the orifice integrally assembled and fixed in the on/off valve.

A fifth aspect of the pressure-type flow controller according to the present invention is characterized in that in the first aspect, the control valve for pressure control includes a metal diaphragm valve body, the metal diaphragm valve body is located under the on/off valve, a central portion of the metal diaphragm valve body comes into or out of contact with a valve seat formed in the main body, and the first passage portion is formed at a central position of the valve seat.

A sixth aspect of the pressure-type flow controller according to the present invention is characterized in that in the second aspect, the control valve for pressure control includes a metal diaphragm valve body, a central portion of the metal diaphragm valve body comes into or out of contact with a valve seat formed in the main body, and the horizontal passage portion is formed at a central position of the valve seat.

A seventh aspect of the pressure-type flow controller according to the present invention is characterized in that in the third aspect, the control valve for pressure control includes a metal diaphragm valve body, a central portion of the metal diaphragm valve body comes into or out of contact with a valve seat formed in the main body, and the fourth passage portion is formed at a central position of the valve seat.

An eighth aspect of the pressure-type flow controller according to the present invention is characterized in that in the first aspect, the pressure sensor includes: a casing; a pressure introducing pipe provided to the casing protruding outward and forming a pressure introducing hole; a pressure receiving chamber provided in the casing and communicating with the pressure introducing hole; a diaphragm provided in the casing displacing in response to the pressure of the pressure receiving chamber, and a pressure detecting element provided in the casing for converting the pressure into an electrical signal based on the displacement of the diaphragm, and a tip portion of the pressure introducing pipe is air-tightly attached to the main body to allow for communication between the pressure introducing hole of the pressure introducing pipe and the third passage portion.

A ninth aspect of the pressure-type flow controller according to the present invention is characterized in that in the second aspect, the pressure sensor includes: a casing; a pressure introducing pipe provided to the casing protruding outward and forming a pressure introducing hole; a pressure receiving chamber provided in the casing and communicating with the pressure introducing hole; a diaphragm provided in the casing displacing in response to the pressure of the pressure receiving chamber, and a pressure detecting element provided in the casing for converting the pressure into an electrical signal based on the displacement of the diaphragm, and a tip portion of the pressure introducing pipe is air-tightly attached to the main body to allow communication between the pressure introducing hole of the pressure introducing pipe and the vertical passage portion.

A tenth aspect of the pressure-type flow controller according to the present invention is characterized in that in the third aspect, the pressure sensor is inserted and fixed into an insertion hole formed in the main body through a ring gasket, the pressure sensing chamber on the pressure sensing surface of the pressure sensor is defined by a space surrounded by an inner bottom surface of the insertion hole, the ring gasket, and the pressure sensing surface of the pressure sensor, the fourth passage portion is connected to an end portion of the pressure sensing chamber on the control valve for pressure control side, and the fifth passage portion is connected to an end portion of the pressure sensing chamber on the on/off valve side.

An eleventh aspect of the pressure-type flow controller according to the present invention is characterized in that in the first aspect, the cross-sectional shapes of the first passage portion, the second passage portion, and the third passage portion are each a circular shape having an inner diameter of 0.5 mm to 1.0 mm.

A twelfth aspect of the pressure-type flow controller according to the present invention is characterized in that in the second aspect, the cross-sectional shapes of the horizontal passage portion and the vertical passage portion are each a circular shape having an inner diameter of 0.5 mm to 1.0 mm.

A thirteenth aspect of the pressure-type flow controller according to the present invention is characterized in that in the third aspect, the cross-sectional shapes of the fourth passage portion and the fifth passage portion are each a circular shape having an inner diameter of 0.5 mm to 1.0 mm.

A first aspect of the pressure-type flow controller according to the present invention is characterized in that in the second aspect or the third aspect, the fluid inlet and the fluid outlet are formed on the same surface of the main body such that the fluid inlet and the fluid outlet are arranged in one direction on the main body.

Advantageous Effects of Invention

In the present invention, a control valve for pressure control is fixed in a horizontal position to a main body provided with a fluid passage, and also an on/off valve is fixed in a vertical position. Accordingly, the distance between the control valve for pressure control and the on/off valve can be reduced, whereby the internal volume of the fluid passage between the control valve for pressure control and an orifice provided on the upstream side of the on/off valve can be made smaller than before. As a result, the shutoff characteristics can be improved.

In the present invention, to a main body provided with a fluid passage, a control valve for pressure control and an on/off valve are fixed in a horizontal position to be opposed to each other. Accordingly, the distance between the control valve for pressure control and the on/off valve can be reduced, whereby the internal volume of the fluid passage between the control valve for pressure control and an orifice provided on the upstream side of the on/off valve can be made smaller than before. As a result, the shutoff characteristics can be improved.

In the present invention, the on/off valve and the orifice are formed as an orifice-built-in valve having the orifice integrally assembled and fixed in the on/off valve. Accordingly, further downsizing of the pressure-type flow controller can be achieved, whereby the internal volume of the fluid passage can be made even smaller.

In the present invention, the pressure sensor for detecting the internal pressure of the fluid passage between the control valve for pressure control and the orifice includes a pressure introducing pipe projecting outward from the casing of the pressure sensor, and a tip portion of the pressure introducing pipe is air-tightly attached to the main body. Accordingly, the space for attaching the pressure sensor to the main body can be small, and the distance between the control valve for pressure control and the orifice can be further reduced, whereby the internal volume of the fluid passage can be further minimized.

In the present invention, the fourth passage portion is connected to an end portion of the pressure sensing chamber on the control valve for pressure control side, while the fifth passage portion is connected to an end portion of the pressure sensing chamber on the on/off valve side. Accordingly, the length of the fourth passage portion and that of the fifth passage portion can be shortened, and, as a result, the internal volume of the fluid passage between the control valve for pressure control and the orifice provided on the upstream side of the on/off valve can be minimized.

In the present invention, the cross-sectional shapes of the first passage portion, the second passage portion, and the third passage portion of the fluid passage, those of the horizontal passage portion and the vertical passage portion of the fluid passage, and those of the fourth passage portion and the fifth passage portion are each a circular shape having an inner diameter of 0.5 mm to 1.0 mm. Accordingly, the internal volume of the fluid passage can be further minimized.

In the present invention, the fluid inlet and the fluid outlet are formed on the same surface of the main body such that the fluid inlet and the fluid outlet are arranged in one direction on the main body. Accordingly, when the pressure-type flow controller is integrated, since the fluid inlet and the fluid outlet face in the same direction, facilitating piping can be made easier.

DESCRIPTION OF EMBODIMENTS

Hereinafter, embodiments of the present invention is described in details based on the drawings.

Figure 1:
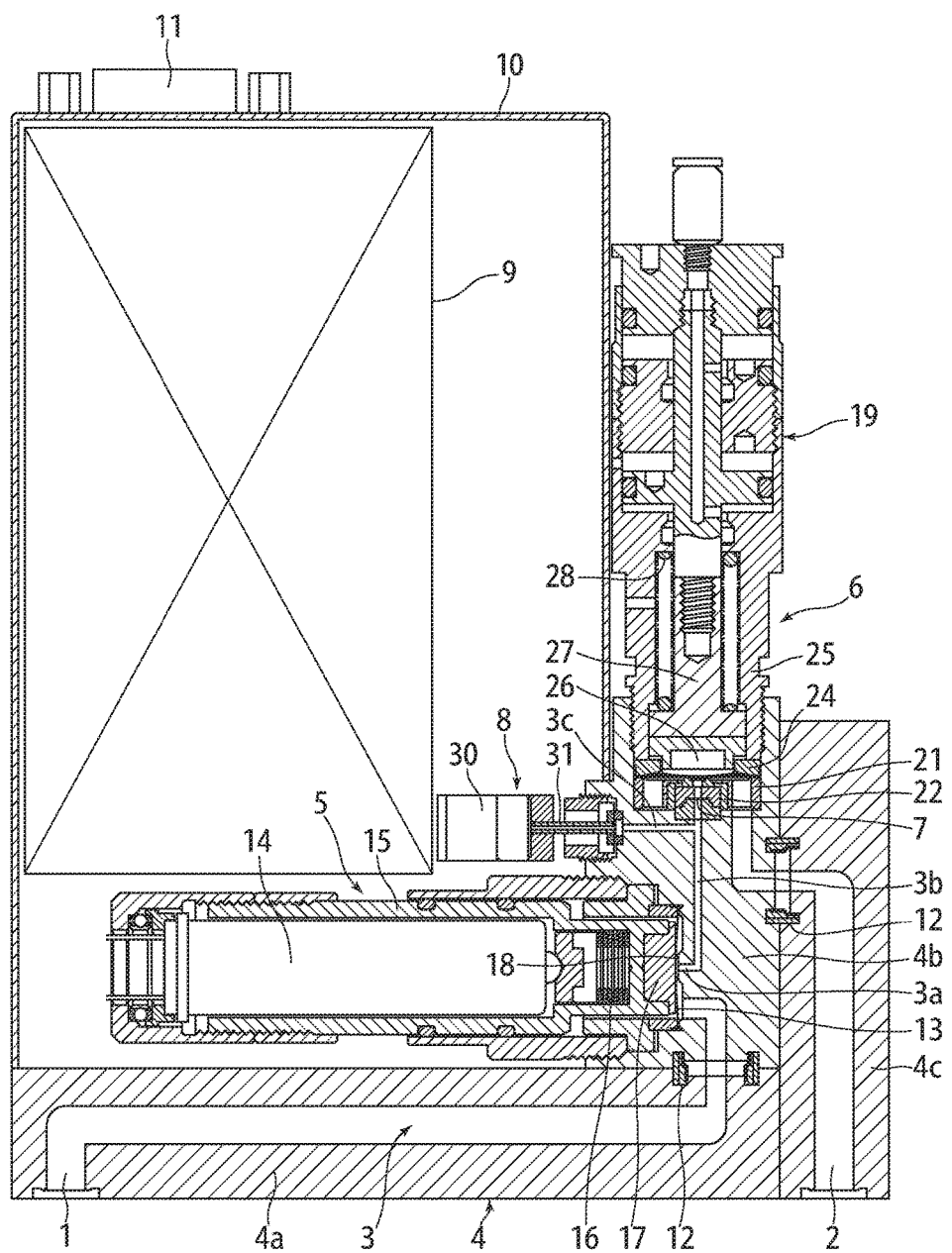
FIG. 1 A cross-sectional view of a pressure-type flow controller according to a first embodiment of the present invention.
Figure 2:
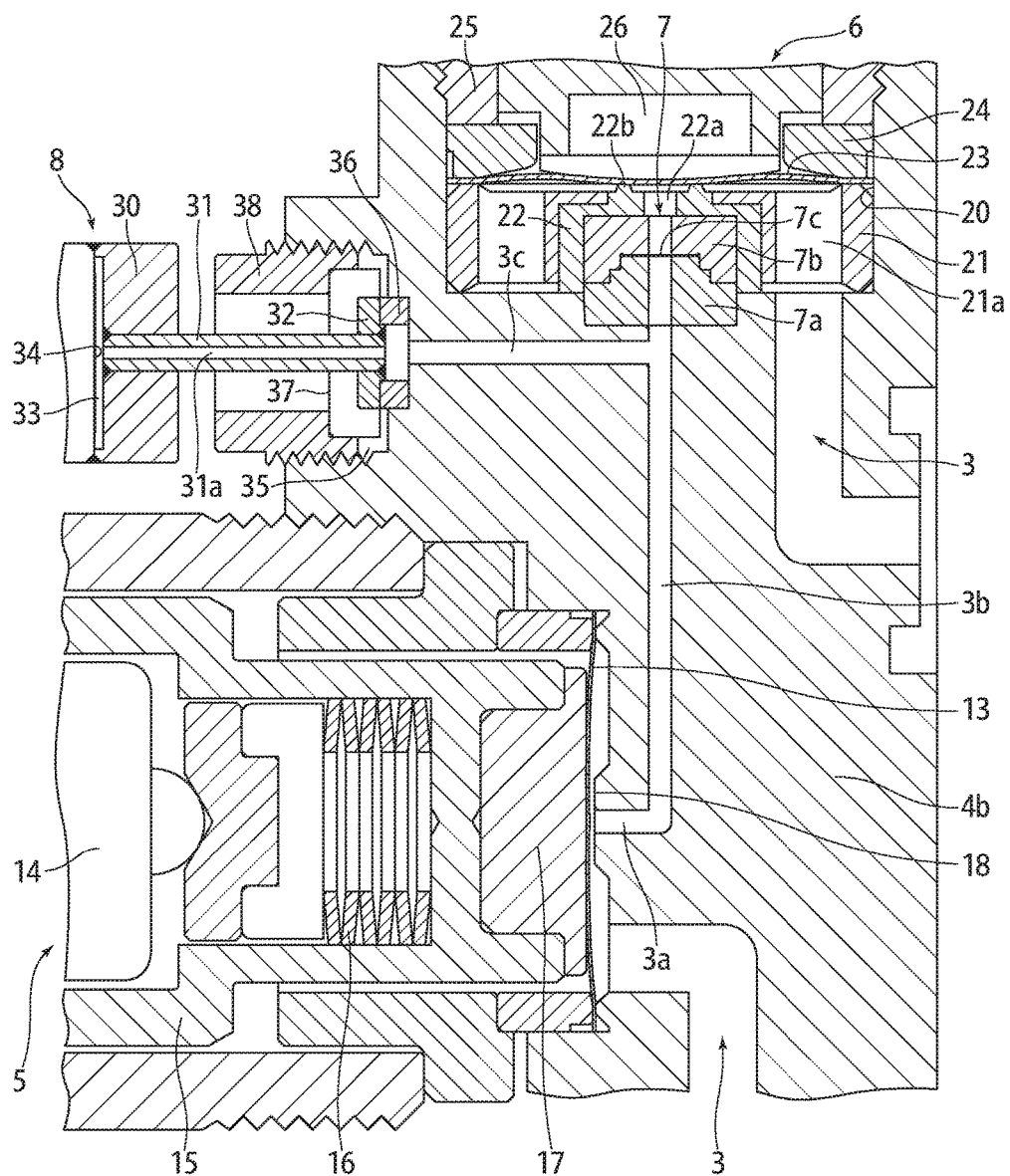
FIG. 2 An enlarged cross-sectional view of the major part of the pressure-type flow controller shown in FIG. 1.

FIG. 1 and FIG. 2 show a pressure-type flow controller according to a first embodiment of the present invention. The pressure-type flow controller includes: a main body 4 provided with a fluid passage 3 communicating between a fluid inlet 1 and a fluid outlet 2; a control valve for pressure control 5 fixed in a horizontal position to the main body 4 for opening/closing the fluid passage 3; an on/off valve 6 fixed in a vertical position to the main body 4 for opening/closing the fluid passage 3 on the downstream side of the control valve for pressure control 5; an orifice 7 provided in the fluid passage 3 on the upstream side of the on/off valve 6; and a pressure sensor 8 fixed to the main body 4 for detecting the internal pressure of the fluid passage 3 between the control valve for pressure control 5 and the orifice 7. The fluid passage 3 includes: a first passage portion 3a in a horizontal position connected to the control valve for pressure control 5; a second passage portion 3b in a vertical position connecting between the first passage portion 3a and the orifice 7; and a third passage portion 3c in a horizontal position connecting between the second passage portion 3b and the pressure sensor 8.

The pressure-type flow controller is vertically arranged type, in which the control valve for pressure control 5 and the on/off valve 6 are arranged at right angles to the main body 4. One end portion of the control valve for pressure control 5 is located under the on/off valve 6 to make the control valve for pressure control 5 and the on/off valve 6 as close as possible to each other.

Parenthetically, in FIG. 1, 9 is a control panel having electronic components mounted on a printed wiring board, 10 is a casing, and 11 is a connector for connection.

The main body 4 includes an inlet-side block 4a formed in a horizontally long rectangular shape, a main body block 4b formed in a vertically long rectangular shape and arranged on the upper surface of one end portion of the inlet-side block 4a (upper surface of the right-side end portion of the inlet-side block 4a shown in FIG. 1), and an outlet-side block 4c formed in a vertically long rectangular shape and arranged on one end surface of the inlet-side block 4a (right-hand end surface of the inlet-side block 4a shown in FIG. 1) and one side surface of the main body block 4b (right-hand side surface of the main body block 4b shown in FIG. 1). The blocks 4a, 4b, and 4c are joined together with a fixing bolt (not illustrated) and thus integrated.

In addition, the fluid inlet 1 is formed on the lower surface of the inlet-side block 4a, while the fluid outlet 2 is formed on the lower surface of the outlet-side block 4c, and the fluid passage 3 communicating between the fluid inlet 1 and the fluid outlet 2 is formed in the inlet-side block 4a, the main body block 4b, and the outlet-side block 4c.

Furthermore, at each junction in the fluid passage 3 between the inlet-side block 4a and the main body block 4b and each junction in the fluid passage 3 between the main body block 4b and the outlet-side block 4c, a gasket 12 for sealing is interposed.

One end portion of the control valve for pressure control 5 is screw-fixed in a horizontal position to the other side surface of a lower end portion of the main body block 4b (left-hand side surface of the lower end portion of the main body block 4b shown in FIG. 1).

The control valve for pressure control 5 is an on/off valve using a known disk-shaped metal diaphragm valve body 13, a piezoelectric actuation element 14, and the like. When the piezoelectric actuation element 14 is energized, the piezoelectric actuation element 14 expands to move a cylindrical body 15 in a direction away from the main body block 4b (left direction in FIG. 1) against the elasticity of an elastic body 16. As a result, a valve body presser 17 moves in a direction away from the main body block 4b, and the metal diaphragm valve body 13 turns back into the curved shape due to its self-elastic force and thus comes out of contact with a valve seat 18 to open the valve. In addition, the degree of valve opening is adjusted by changing the voltage applied to the piezoelectric actuation element 14.

The valve seat 18, with which the metal diaphragm valve body 13 of the control valve for pressure control 5 comes into or out of contact, is formed at a position facing a central portion of the metal diaphragm valve body 13 of the main body block 4b. At a central position of the valve seat 18, the first passage portion 3a in a horizontal position connected to the control valve for pressure control 5 is formed. According to the configuration shown in FIG. 2, a gas flows in through the gap between the outer periphery of the metal diaphragm valve body 13 of the control valve for pressure control 5 and the valve seat 18, and flows out from the center of the valve seat 18. As a result, the internal volume of the fluid passage 3 between the control valve for pressure control 5 and the orifice 7 can be reduced with the metal diaphragm valve body 13 being closed.

In addition, the metal diaphragm valve body 13 is located under the on-off valve 6 on the control valve for pressure control 5. As a result, the length of the first passage portion 3a in a horizontal position connected to the control valve for pressure control 5 can be shortened, and the internal volume of the first passage portion 3a can be reduced.

In order to make the internal volume of the first passage portion 3a as small as possible, it is preferred to make the inner diameter thereof as small as possible. In this embodiment, the inner diameter of the first passage portion 3a is 0.5 mm to 1.0 mm. Since the first passage portion 3a is short in length and has a small inner diameter, the internal volume thereof can be made small.

A lower end portion of the on/off valve 6 is screw-fixed in a vertical position to the upper end surface of the main body block 4b.

In order to achieve the downsizing of the pressure-type flow controller and the reduction of the internal volume of the fluid passage 3, an orifice-built-in valve configured such that the on/off valve 6 and the orifice 7 are integrally assembled and fixed, is used as the on/off valve 6.

That is, the orifice-built-in valve is the on/off valve 6 using a valve mechanism including a known metal diaphragm valve body 23, the orifice 7, and the like and a pneumatic valve actuator 19, and is configured to have the same structure as known valves (e.g., Japanese Patent No. 3522535, Japanese Patent No. 4137267, etc.).

As shown in FIG. 1 and FIG. 2, the valve mechanism is provided in a depressed portion 20 formed on the upper end surface of the main body block 4b, and includes: an inner disk 21 inserted and fixed into the depressed portion 20, forming an outflow passage 21a; a valve seat body 22, inserted and fixed into a central portion of the inner disk 21, forming an inflow passage 22a and a valve seat 22b; the orifice 7, provided in a central portion of the valve seat body 22, forming an orifice hole (not illustrated), communicating with the inflow passage 22a of the valve seat body 22; the disk-shaped metal diaphragm valve body 23 that comes into or out of contact with the valve seat 22b of the valve seat body 22; a bonnet insert 24 and a bonnet 25 that sandwiches, with the inner disk 21, the outer periphery of the metal diaphragm valve body 23; a valve body presser 26 pressing the metal diaphragm valve body 23; a stem 27 holding the valve body presser 26; a spring 28 energizing the stem 27 downward; and the like.

Parenthetically, a known gasket-type orifice including a projecting orifice base 7a having a pass-through passage formed in a central portion, a depressed orifice base 7b having a pass-through passage formed in the central portion and communicating with the passage of the projecting orifice base 7a, and an orifice plate 7c air-tightly attached between the orifice bases 7a and 7b, having an orifice hole (not illustrated) formed in a central portion, is used as the orifice 7.

Then, the orifice 7 of the on/off valve 6 and the downstream-side end portion of the first passage portion 3a are connected to communicate with each other through the second passage portion 3b in a vertical position formed in the main body block 4b.

In order to make the internal volume of the second passage portion 3b as small as possible, it is preferred to make the inner diameter thereof as small as possible. In this embodiment, the inner diameter of the second passage portion 3b is 0.5 mm to 1.0 mm. In addition, in order to make the internal volume of the second passage portion 3b as small as possible, it is preferred to make the length of the second passage portion 3b as short as possible, so the on/off valve 6 is arranged as close as possible to the first passage portion 3a.

Figure 3:
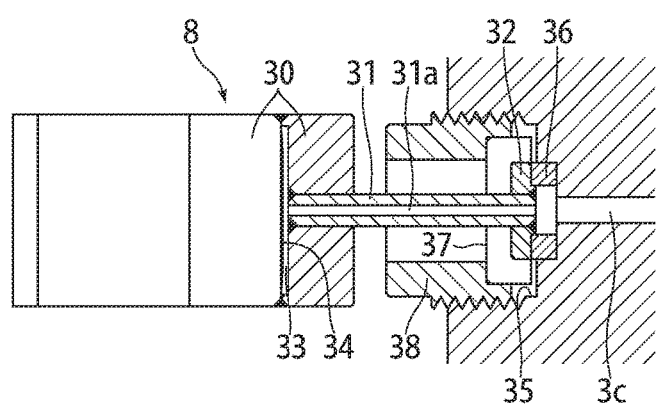
FIG. 3 An enlarged cross-sectional view of a pressure sensor attached to a main body.

As shown in FIG. 2 and FIG. 3, the pressure sensor 8 includes: a cylindrical casing 30; a pressure introducing pipe 31 provided at the axial center of the casing 30 protruding outward, forming a pressure introducing hole 31a; a gasket presser 32 firmly fixed to a tip portion of the pressure introducing pipe 31 by welding; a pressure receiving chamber 33 provided in the casing 30, communicating with the pressure introducing hole 31a; a diaphragm 34 provided in the casing 30, displacing in response to the pressure of the pressure receiving chamber 33; and a pressure detecting element (not illustrated) provided in the casing 30, including a pressure sensitive element or a strain gage for converting the pressure into an electrical signal based on the displacement of the diaphragm 34. The surface of the diaphragm 34 serves as a pressure sensing surface (pressure receiving surface), and the pressure applied thereto is converted into an electrical signal to be detected.

Figure 10:
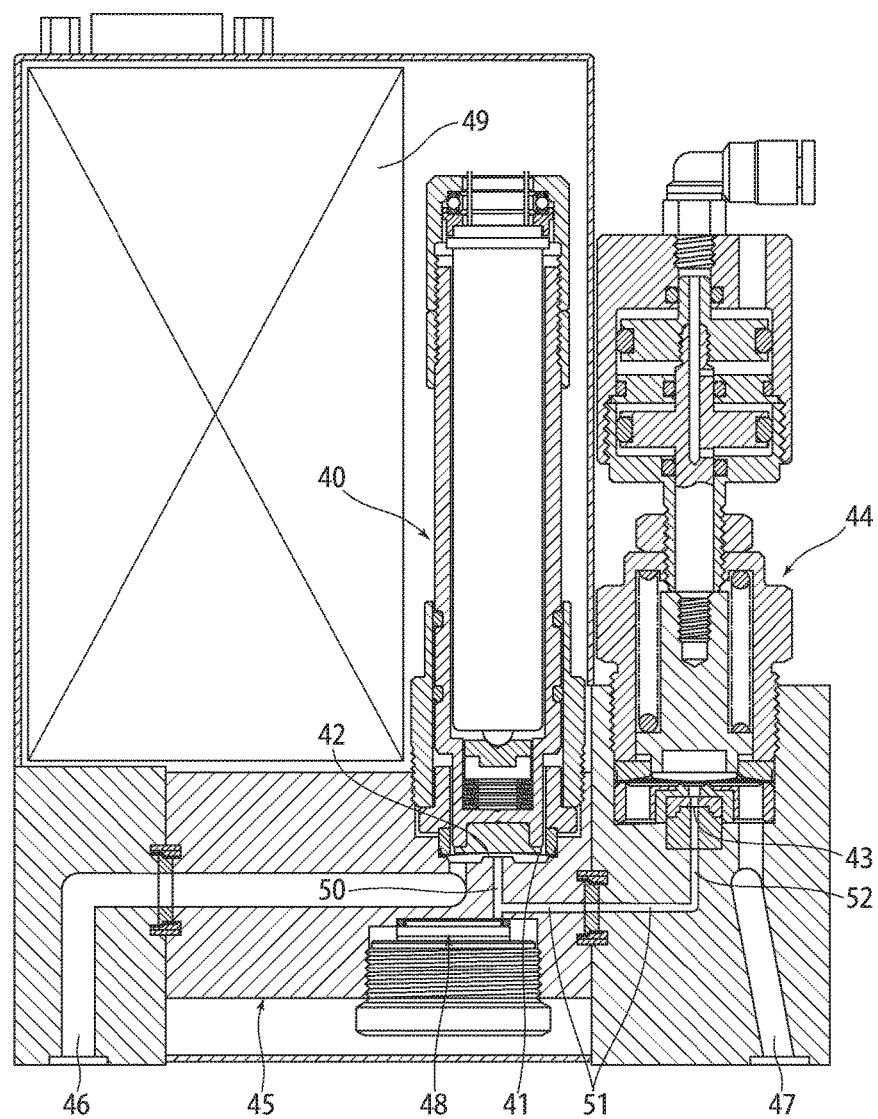
FIG. 10 A cross-sectional view showing a conventional pressure-type flow controller.

The pressure sensor 8 is formed to have an outer diameter of 8 mm, which is half the outer diameter of the conventional pressure sensor shown in FIG. 10 (16 mm), thus the installation space can be smaller. As a result, the distance between the control valve for pressure control 5 and the on/off valve 6 can be reduced, and the length of the second passage portion 3b can be shortened, and the internal volume thereof can be minimized.

In addition, because the pressure sensor 8 includes the pressure introducing pipe 31 projecting outward from the casing 30 of the pressure sensor 8, and a tip portion of the pressure introducing pipe 31 is air-tightly attached to the main body 4, the space for attaching the pressure sensor 8 to the main body 4 can be small, and the distance between the control valve for pressure control 5 and the orifice 7 can be further reduced, whereby the internal volume of the fluid passage can be made still smaller.

Then, in the pressure sensor 8, a tip portion of the pressure introducing pipe 31 is air-tightly inserted and fixed to an insertion hole 35 formed on the other side surface of the main body block 4b (left-hand side surface of the main body block 4b shown in FIG. 1) through a gasket 36 with a split ring 37 (or a non-illustrated U-shaped ring) and the bonnet 38; while the pressure introducing hole 31a of the pressure introducing pipe 31 is connected to, so as to communicate with, the third passage portion 3c in a horizontal position formed in the main body block 4b and connecting between the second passage portion 3b and the pressure sensor 8.

That is, in the pressure sensor 8, the split ring 37 (or U-shaped ring) is placed to cover the gasket presser 32, while the bonnet 38, which has already been loosely fit over the pressure introducing pipe 31, is placed to cover the split ring 37 (or U-shaped ring). The gasket presser 32, the split ring 37 (or U-shaped ring), and the bonnet 38 in this state are inserted into the insertion hole 35 of the main body block 4b, into which the gasket 36 has already been attached, and the bonnet 38 is tightened to the main body block 4b so that the split ring 37 (or U-shaped ring) presses the gasket presser 32 and the gasket 36. As a result, the gasket 36 is pressed by the gasket presser 32, and the interface between one end surface of the gasket 36 and the bottom surface of the insertion hole 35, also the interface between the other end surface of the gasket 36 and the tip surface of the gasket presser 32 each serve as a sealing portion, so that the pressure sensor 8 is air-tightly inserted and fixed to the insertion hole of the main body block 4b.

In order to make the internal volume of the third passage portion 3c as small as possible, it is preferred to make the inner diameter thereof as small as possible. In this embodiment, the inner diameter of the third passage portion 3c is 0.5 mm to 1.0 mm. In addition, in order to make the internal volume of the second passage portion 3b as small as possible, it is preferred to make the length of the third passage portion 3c as short as possible. Thus, the pressure sensor 8 is arranged as close as possible to the second passage portion 3b.

Figure 4:
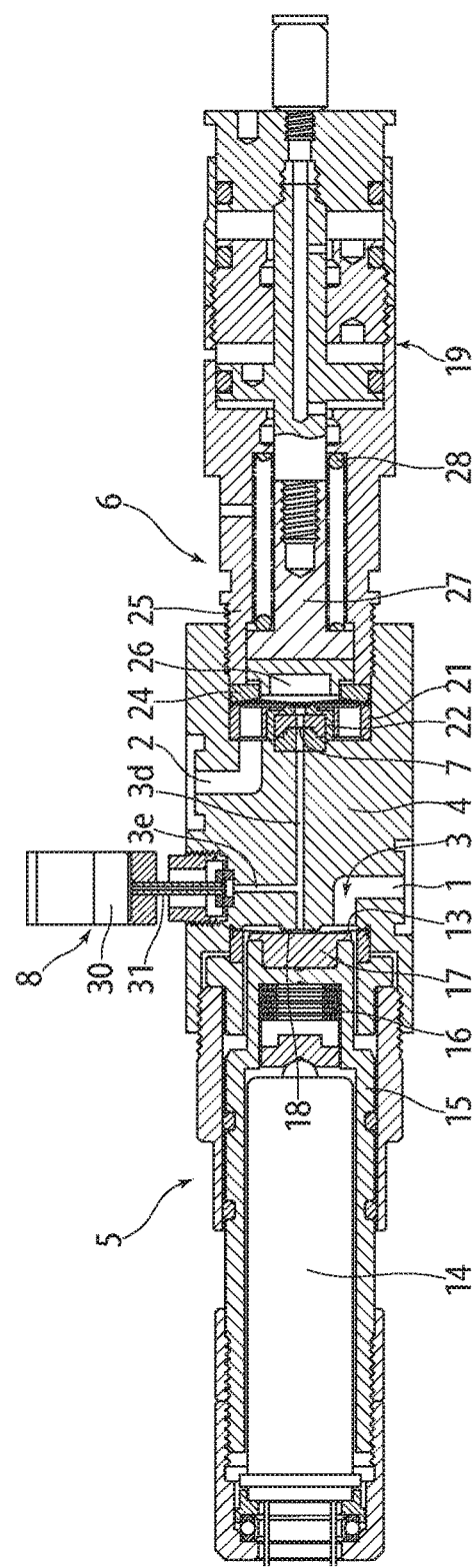
FIG. 4 A cross-sectional view of a pressure-type flow controller according to a second embodiment of the present invention.
Figure 5:
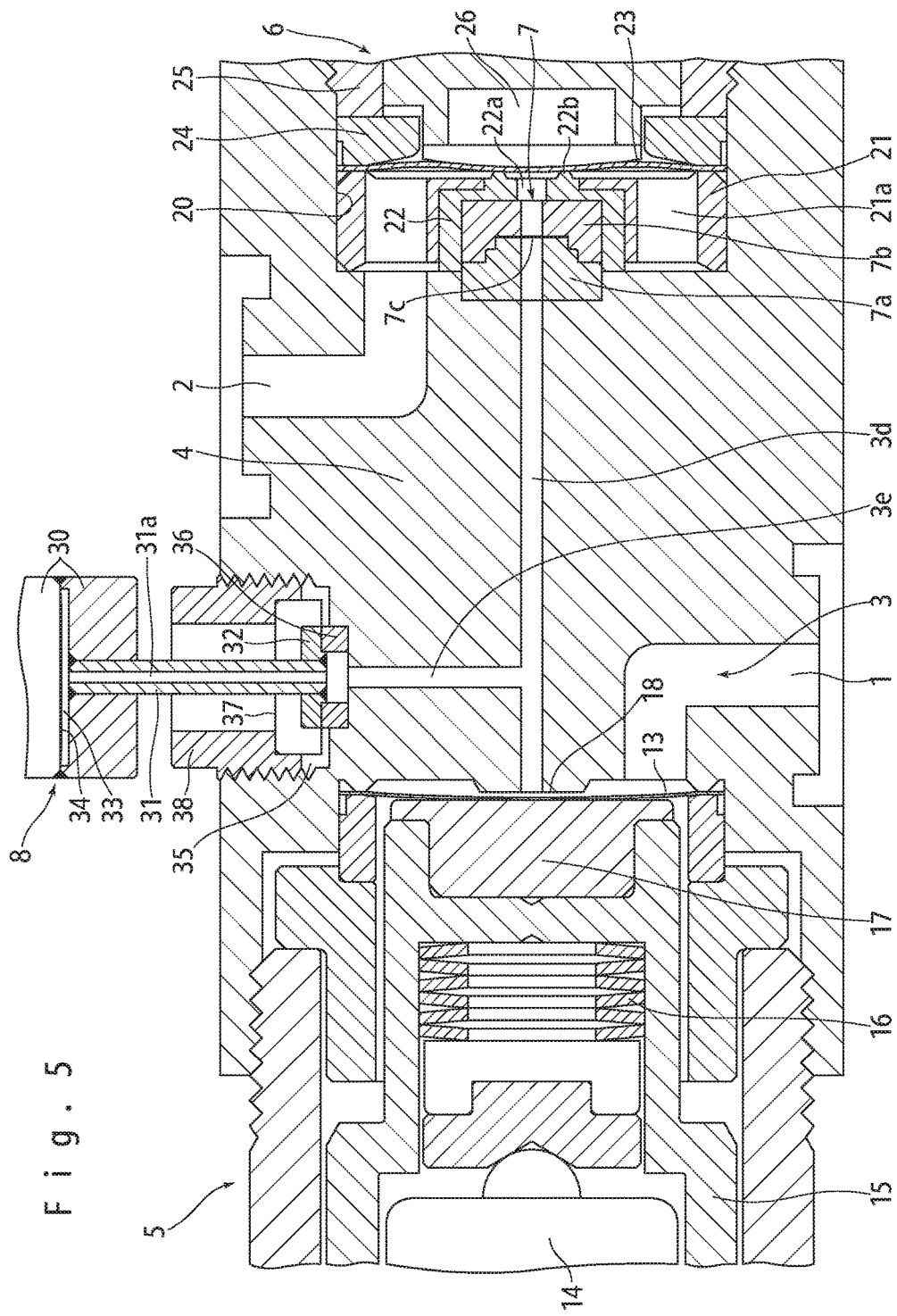
FIG. 5 An enlarged cross-sectional view of the major part of the pressure-type flow controller shown in FIG. 4.

FIG. 4 and FIG. 5 show a pressure-type flow controller according to a second embodiment of the present invention. The pressure-type flow controller includes: a main body 4 provided with a fluid passage 3 communicating between a fluid inlet 1 and a fluid outlet 2; a control valve for pressure control 5 fixed in a horizontal position to the main body 4 for opening/closing the fluid passage 3; an on/off valve 6 fixed to the main body 4 to be opposed to the control valve for pressure control 5 for opening/closing the fluid passage 3 on the downstream side of the control valve for pressure control 5; an orifice 7 provided in the fluid passage 3 on the upstream side of the on/off valve 6; and a pressure sensor 8 fixed to the main body 4 for detecting the internal pressure of the fluid passage 3 between the control valve for pressure control 5 and the orifice 7. The fluid passage 3 includes: a horizontal passage portion 3d connecting between the control valve for pressure control 7 and the orifice 7; and a vertical passage portion 3e connecting between the horizontal passage portion 3d and the pressure sensor 8.

The pressure-type flow controller is opposingly arranged type, in which the control valve for pressure control 5 and the on/off valve 6 are arranged on opposite sides of the main body 4 to make the control valve for pressure control 5 and the on/off valve 6 as close as possible to each other.

The main body 4 is formed in a horizontally long block shape. The fluid inlet 1 is formed on one side surface of the main body 4 (lower surface of the main body 4 shown in FIG. 4), the fluid outlet 2 is formed on the other side surface of the main body 4 (upper surface of the main body 4 shown in FIG. 4), and the fluid passage 3 communicating between the fluid inlet 1 and the fluid outlet 2 is also formed in the main body 4.

One end portion of the control valve for pressure control 5 is screw-fixed in a horizontal position to one end surface of the main body 4 (left-hand end surface of the main body 4 shown in FIG. 4).

The control valve for pressure control 5 is an on/off valve using a known disk-shaped metal diaphragm valve body 13, a piezoelectric actuation element 14, and the like. When the piezoelectric actuation element 14 is energized, the piezoelectric actuation element 14 expands to move a cylindrical body 15 in a direction away from the main body 4 (left direction in FIG. 4) against the elasticity of an elastic body 16. As a result, a valve body presser 17 moves in a direction away from the main body 4, and the metal diaphragm valve body 13 turns back into the curved shape due to its self-elastic force, and comes out of contact with a valve seat 18 to open the valve. In addition, the degree of valve opening is adjusted by changing the voltage applied to the piezoelectric actuation element 14.

The valve seat 18, with which the metal diaphragm valve body 13 of the control valve for pressure control 5 comes into or out of contact, is formed at a position facing a central portion of the metal diaphragm valve body 13 of the main body 4. At a central position of the valve seat 18, the horizontal passage portion 3d connecting between the control valve for pressure control 5 and the orifice 7 is formed. According to the configuration shown in FIG. 4, a gas flows in through the gap between the outer periphery of the metal diaphragm valve body 13 of the control valve for pressure control 5 and the valve seat 18, and flows out from the center of the valve seat 18. As a result, the internal volume of the fluid passage 3 between the control valve for pressure control 5 and the orifice 7 can be reduced with the metal diaphragm valve body 13 being closed.

In order to make the internal volume of the horizontal passage portion 3d as small as possible, it is preferred to make the inner diameter thereof as small as possible. In this embodiment, the inner diameter of the horizontal passage portion 3d is 0.5 mm to 1.0 mm. In addition, in order to make the internal volume of the horizontal passage portion 3d as small as possible, it is preferred to make the length of the horizontal passage portion 3d as short as possible. Thus, the control valve for pressure control 5 and the on/off valve 6 arranged to be opposed to each other are arranged as close as possible to each other.

One end portion of the on/off valve 6 is screw-fixed in a horizontal position to the other end surface of the main body 4 in a horizontally long block shape (right-hand end surface of the main body 4 shown in FIG. 4), and the on/off valve 6 is arranged to be opposed to the control valve for pressure control 5.

In order to achieve the downsizing of the pressure-type flow controller and the reduction of the internal volume of the fluid passage 3, an orifice-built-in valve configuration, that the on/off valve 6 and the orifice 7 are integrally assembled and fixed, is used as the on/off valve 6.

That is, the orifice-built-in valve is the on/off valve 6 using a valve mechanism including a known metal diaphragm valve body 23, the orifice 7, and the like, and a pneumatic valve actuator 19; is configured to have the same structure as a known valve (e.g., Japanese Patent No. 3522535, Japanese Patent No. 4137267, etc.).

As shown in FIG. 4 and FIG. 5, the valve mechanism is provided in a depressed portion 20 formed on the other end surface of the main body 4, and includes: an inner disk 21 inserted and fixed into the depressed portion 20, forming an outflow passage 21a; a valve seat body 22 inserted and fixed into a central portion of the inner disk 21, forming an inflow passage 22a and a valve seat 22b; the orifice 7 provided in a central portion of the valve seat body 22, forming an orifice hole (not illustrated), communicating with the inflow passage 22a of the valve seat body 22; the disk-shaped metal diaphragm valve body 23 that comes into or out of contact with the valve seat 22b of the valve seat body 22; a bonnet insert 24 and a bonnet 25 that sandwiches, with the inner disk 21, the outer periphery of the metal diaphragm valve body 23; a valve body presser 26 pressing the metal diaphragm valve body 23; a stem 27 holding the valve body presser 26; a spring 28 energizing the stem 27 toward the main body 4; and the like.

Parenthetically, a known gasket-type orifice including a projecting orifice base 7a having a pass-through passage formed in a central portion; a depressed orifice base 7b having a pass-through passage formed in a central portion and communicating with the passage of the projecting orifice base 7a; and an orifice plate 7c air-tightly attached between the orifice bases 7a and 7b and having an orifice hole (not illustrated) formed in a central portion, is used as the orifice 7.

Then, the orifice 7 of the on/off valve 6 and the control valve for pressure control 5 are connected to communicate with each other through the horizontal passage portion 3d in a horizontal position formed in the main body 4.

As shown in FIG. 3, the pressure sensor 8 includes: a cylindrical casing 30; a pressure introducing pipe 31 provided at the axial center of the casing 30 protruding outward and forming a pressure introducing hole 31a; a gasket presser 32 firmly fixed to a tip portion of the pressure introducing pipe 31 by welding; a pressure receiving chamber 33 provided in the casing 30 and communicating with the pressure introducing hole 31a; a diaphragm 34 provided in the casing 30 displacing in response to the pressure of the pressure receiving chamber 33; and a pressure detecting element (not illustrated) provided in the casing 30 and including a pressure sensitive element and a strain gage for converting the pressure into an electrical signal based on the displacement of the diaphragm 34. The pressure is detected by converting the pressure applied on the surface of the diaphragm 34, which serves as a pressure sensing surface (pressure receiving surface), into an electrical signal.

Since the outer diameter of the pressure sensor 8 is formed as 8 mm, which is half the outer diameter of the conventional pressure sensor 8 shown in FIG. 10 (16 mm), the installation space can be minimized. As a result, the distance between the control valve for pressure control 5 and the on/off valve 6 can be reduced, and the length of the horizontal passage portion 3d can be shortened, and the internal volume thereof can be minimized.

Then, in the pressure sensor 8, a tip portion of the pressure introducing pipe 31 is air-tightly inserted and fixed to an insertion hole 35 formed on the other side surface of the main body 4 through a gasket 36 with a split ring 37 (or U-shaped ring) and the bonnet 38, while the pressure introducing hole 31a of the pressure introducing pipe 31 is connected to, so as to communicate with, the vertical passage portion 3e formed in the main body 4 and connecting between the horizontal passage portion 3d and the pressure sensor 8.

The attachment of the pressure sensor 8 to the main body 4 is completely the same as that of the pressure sensor 8 in the pressure-type flow controller according to the first embodiment shown in FIG. 1.

In order to make the internal volume of the vertical passage portion 3e as small as possible, it is preferred to make the inner diameter thereof as small as possible. In this embodiment, the inner diameter of the vertical passage portion 3e is 0.5 mm to 1.0 mm. In addition, in order to make the internal volume of the vertical passage portion 3e as small as possible, it is preferred to make the length of the vertical passage portion 3e as short as possible. Thus, the pressure sensor 8 is arranged as close as possible to the horizontal passage portion 3d.

Figure 6:
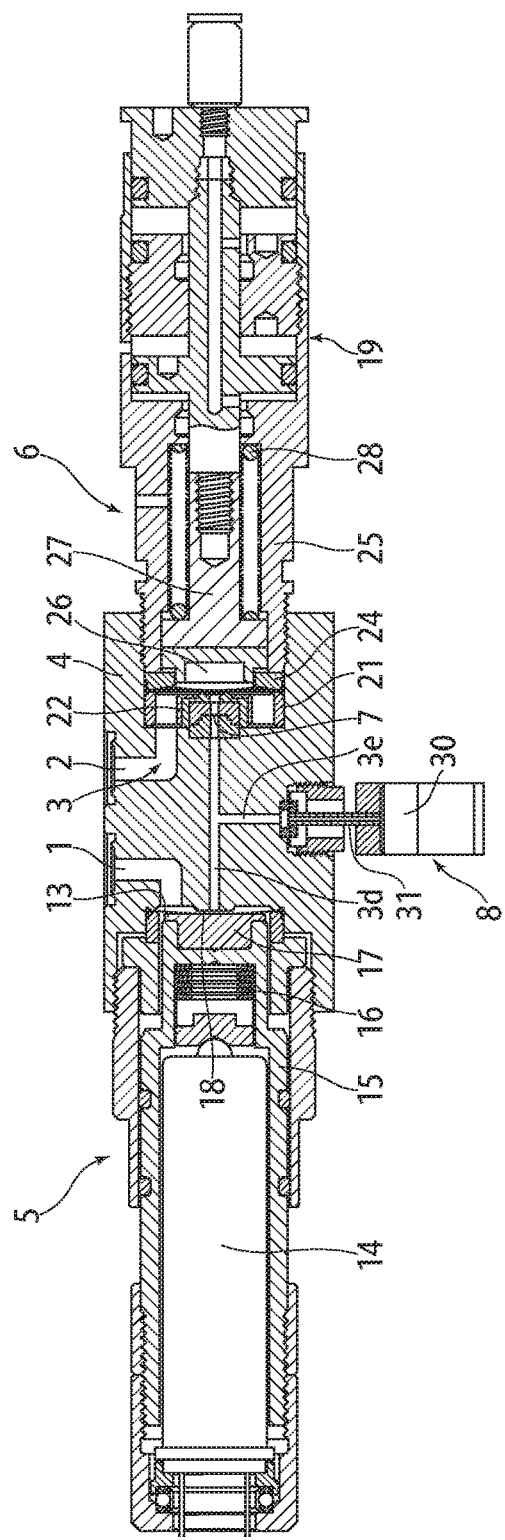
FIG. 6 A cross-sectional view of a pressure-type flow controller according to a third embodiment of the present invention.

FIG. 6 shows a pressure-type flow controller according to a third embodiment of the present invention. In the pressure-type flow controller, a fluid inlet 1 and a fluid outlet 2 are formed on the same surface of a main body 4 (upper surface of the main body 4 shown in FIG. 6) such that the fluid inlet 1 and the fluid outlet 2 are arranged in one direction on the main body 4. At the same time, a pressure sensor 8 is provided at a central position of the surface of the main body 4 on the opposite side of the fluid inlet 1 and the fluid outlet 2 (lower surface of the main body 4 shown in FIG. 6).

Except that the fluid inlet 1 and the fluid outlet 2 are formed on the same surface of the main body 4, and that the pressure sensor 8 is provided at the central position of the opposite surface of the main body 4, the pressure-type flow controller according to the third embodiment is configured to have the same structure as the pressure-type flow controller according to the second embodiment shown in FIG. 4 and FIG. 5. Therefore, the same parts and members as in the pressure-type flow controller according to the second embodiment are indicated with the same reference numerals, and the detailed description thereof is omitted.

Figure 7:
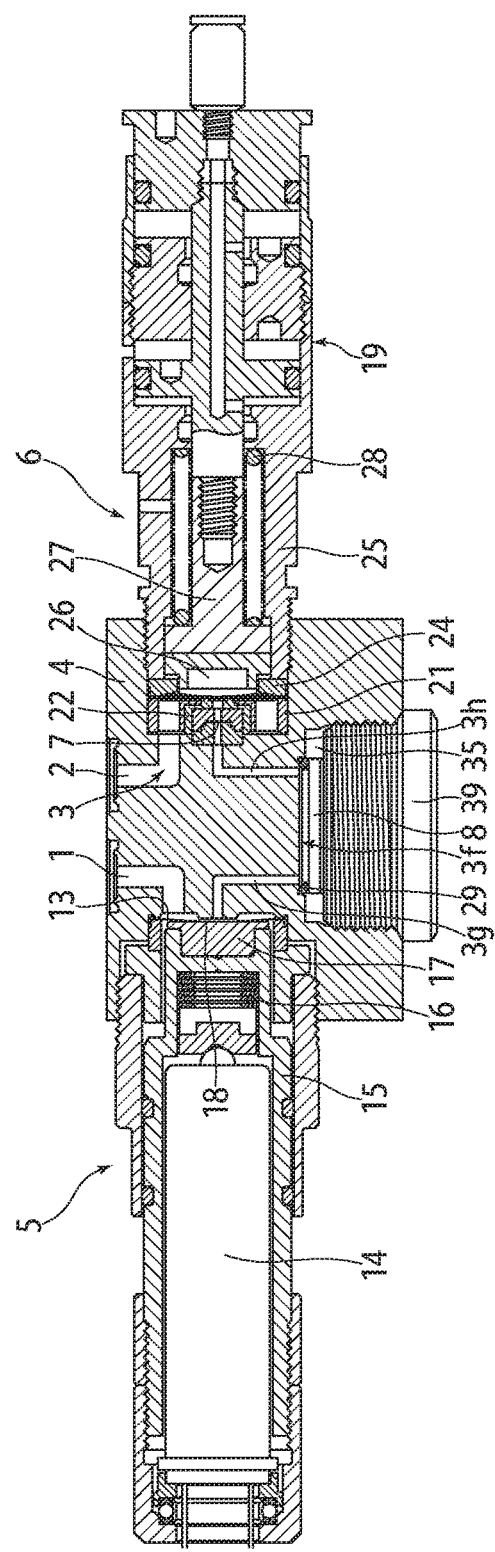
FIG. 7 A cross-sectional view of a pressure-type flow controller according to a fourth embodiment of the present invention.
Figure 8:
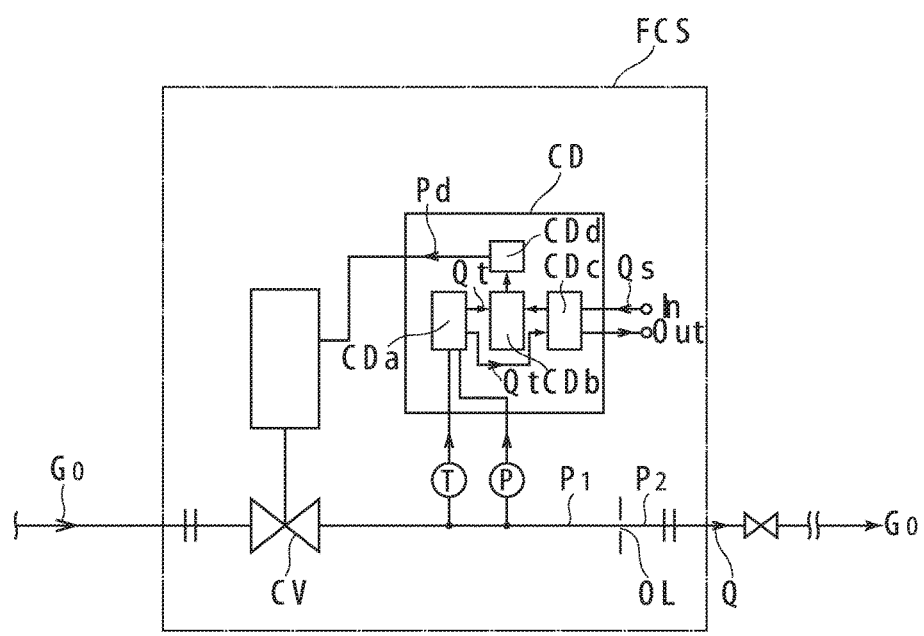
FIG. 8 A basic configuration diagram showing a conventional pressure-type flow controller.
Figure 9:
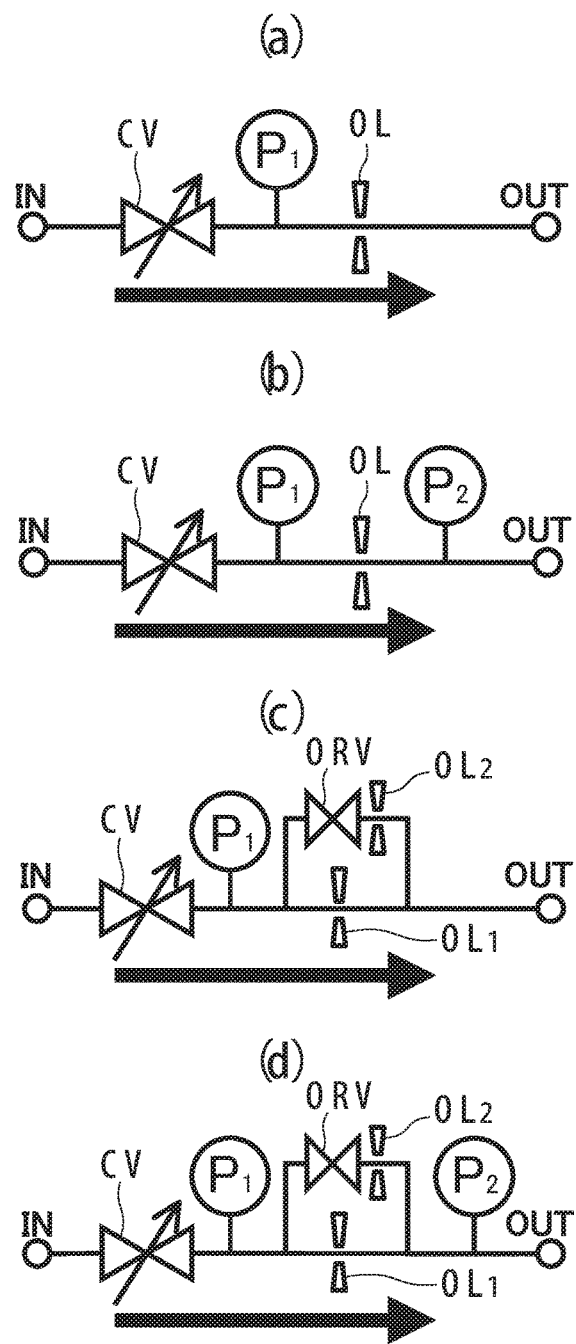
FIG. 9 Schematic configuration diagrams showing conventional pressure-type flow controllers in various forms.

FIG. 7 shows a pressure-type flow controller according to a fourth embodiment of the present invention. The pressure-type flow controller includes: a main body 4 provided with a fluid passage 3 communicating between a fluid inlet 1 and a fluid outlet 2; a control valve for pressure control 5 fixed in a horizontal position to the main body 4 for opening/closing the fluid passage 3; an on/off valve 6 fixed to the main body 4 to be opposed to the control valve for pressure control 5 for opening/closing the fluid passage 3 on the downstream side of the control valve for pressure control 5; an orifice 7 provided in the fluid passage 3 on the upstream side of the on/off valve 6; and a pressure sensor 8 fixed to the main body 4 for detecting the internal pressure of the fluid passage 3 between the control valve for pressure control 5 and the orifice 7. The fluid passage 3 includes: a fourth passage portion 3g connecting between the control valve for pressure control 5 and a pressure sensing chamber 3f on a pressure sensing surface of the pressure sensor 8; and a fifth passage portion 3h spaced from the fourth passage portion 3g and connecting between the pressure sensing chamber 3f and the orifice 7. The fluid passage 3 is configured to pass through the pressure sensing chamber 3f.

Except that the fluid inlet 1 and the fluid outlet 2 are formed on the same surface of the main body 4 (upper surface of the main body 4 shown in FIG. 7), and that a known pressure sensor 8 is provided at a central position of the opposite surface of the main body 4 (lower surface of the main body 4 shown in FIG. 7), the pressure-type flow controller according to the fourth embodiment is configured to have the same structure as the pressure-type flow controller according to the second embodiment shown in FIG. 4 and FIG. 5.

Therefore, the same parts and members as in the pressure-type flow controller according to the second embodiment are indicated with the same reference numerals, and the detailed description thereof is omitted.

The pressure sensor 8 includes a diaphragm having a semiconductor strain gauge formed on a surface, and such a surface serves as a pressure sensing surface (pressure receiving surface). A change in electrical resistance due to the piezoresistance effect resulting from the deformation caused by the pressure applied thereto is converted into an electrical signal, whereby the pressure is detected.

The pressure sensor 8 is inserted into an insertion hole 35 formed on one side surface of the main body 4 (lower surface of the main body 4 shown in FIG. 7) through a ring gasket 29 and fixed with a pressing screw 39. By inserting and fixing the pressure sensor 8 into the insertion hole 35 in this manner, the pressure sensing chamber 3f surrounded by the inner bottom surface of the insertion hole 35, the ring gasket 29, and the pressure sensing surface, which is the pressure receiving surface of the pressure sensor 8, is formed.

Parenthetically, it is desired that the internal volume of the pressure sensing chamber 3f is made as small as possible. However, the diaphragm forming the pressure receiving surface of the pressure sensor 8 is made of stainless steel or the like, and expands and bulges toward the inner bottom surface of the insertion hole 35 at high temperatures. Therefore, it is necessary that the pressure sensing chamber 3f has a depth dimension that allows the thermal expansion of the diaphragm of the pressure sensor 8. For example, a diaphragm of a certain pressure sensor bulges about 0.13 mm at 100° C., and the depth dimension of the pressure sensing chamber 3f, that is, the distance between the inner bottom surface of the insertion hole 35 and the pressure sensing surface (when not deformed), is set at 0.13 to 0.30 mm, for example.

In addition, the ring gasket 29 is made of stainless steel or the like, and is subjected to mirror finishing, solution treatment in a vacuum furnace, or the like to have a high-precision finish.

The fourth passage portion 3g is L-shaped, and one end portion thereof is connected to the control valve for pressure control 5, while the other end portion is connected to an end portion of the pressure sensing chamber 3f on the control valve for pressure control 5 side.

The fifth passage portion 3h is L-shaped, and one end portion thereof is connected to an end portion of the pressure sensing chamber 3f on the on/off valve 6 side, while the other end portion is connected to the orifice 7.

In this manner, since the fourth passage portion 3g and the fifth passage portion 3h are connected to the opposite end portions of the pressure sensing chamber 3f, the pressure sensing chamber 3f can be maximally utilized as the fluid passage 3, whereby the internal volume of the fluid passage 3 can be minimized. That is, because the space volume of the pressure sensing chamber 3f is inevitable, by utilizing the space as the fluid passage 3, the internal volume of the fluid passage 3 can be reduced.

In order to make the internal volumes of the fourth passage portion 3g and the fifth passage portion 3h as small as possible, it is preferable that the inner diameters thereof are as small as possible. In this embodiment, the inner diameters of the fourth passage portion 3g and the fifth passage portion 3h are each 0.5 mm to 1.0 mm. In addition, in order to make the internal volumes of the fourth passage portion 3g and the fifth passage portion 3h as small as possible, it is preferable that the lengths of the fourth passage portion 3g and the fifth passage portion 3h are as short as possible, so the control valve for pressure control 5, the on/off valve 6, and the pressure sensor 8 is arranged as close as possible to one another.

The following Table 1 to Table 3 show the comparison of the volume (internal volume) of the conventional pressure-type flow controller shown in FIG. 10, the volume (internal volume) of the pressure-type flow controller according to the first embodiment shown in FIG. 1 and FIG. 2, and the volume (internal volume) of the pressure-type flow controller according to the second/third embodiment shown in FIG. 4 to FIG. 6.

That is, Table 1 shows the volume of the fluid passage (first fluid passage 50, second fluid passage 51, and third fluid passage 52) between the control valve for pressure control 40 and the orifice 43 of the conventional pressure-type flow controller shown in FIG. 10, together with the volume of the pressure sensing chamber on the pressure sensing surface of the pressure sensor 48. In Table 1, (a) shows volumes in the case where the inner diameters of the first fluid passage 50, the second fluid passage 51, and the third fluid passage 52 are each 1 mm, (b) shows the case of 0.7 mm, and (c) shows the case of 0.5 mm.

In addition, Table 2 shows the volume of the fluid passage 3 (first passage portion 3a, second passage portion 3b, and third passage portion 3c) between the control valve for pressure control 5 and the orifice 7 of the pressure-type flow controller according to the first embodiment shown in FIG. 1 and FIG. 2, together with the volume of the space surrounded by the pressure receiving chamber 33 of the pressure sensor 8, the pressure introducing hole 31a, and the inner peripheral surface of the gasket 36. In Table 2, (a) shows volumes in the case where the inner diameters of the first passage portion 3a, the second passage portion 3b, and the third passage portion 3c are each 1 mm, (b) shows the case of 0.7 mm, and (c) shows the case of 0.5 mm.

Further, Table 3 shows the volume of the fluid passage 3 (horizontal passage portion 3d and vertical passage portion 3e) between the control valve for pressure control 5 and the orifice 7 of the pressure-type flow controller according to the second/third embodiment shown in FIG. 4 to FIG. 6, together with the volume of the space surrounded by the pressure receiving chamber 33 of the pressure sensor 8, the pressure introducing hole 31a, and the inner peripheral surface of the gasket 36. In Table 3, (a) shows volumes in the case where the inner diameters of the horizontal passage portion 3d and the vertical passage portion 3e are each 1 mm, (b) shows the case of 0.7 mm, and (c) shows the case of 0.5 mm.

TABLE 1

| | (a) Conventional Example | | | | (b) Conventional Example | | | | (c) Conventional Example | | |
| --- | --- | --- | --- | --- | --- | --- | --- | --- | --- | --- | --- |
| | Diameter mm | Length mm | Volume cc | | Diameter mm | Length mm | Volume cc | | Diameter mm | Length mm | Volume cc |
| First fluid passage | 1 | 6.7 | 0.00526 | First fluid passage | 0.7 | 6.7 | 0.00258 | First fluid passage | 0.5 | 6.7 | 0.00132 |
| Second fluid passage | 1 | 25.2 | 0.01979 | Second fluid passage | 0.7 | 25.2 | 0.00970 | Second fluid passage | 0.5 | 25.2 | 0.00495 |
| Third fluid passage | 1 | 12.9 | 0.01013 | Third fluid passage | 0.7 | 12.9 | 0.00496 | Third fluid passage | 0.5 | 12.9 | 0.00253 |
| Pressure sensor | 16 mmφ | | 0.03200 | Pressure sensor | 16 mmφ | | 0.03200 | Pressure sensor | 16 mmφ | | 0.03200 |
| | Total | | 0.06719 | | Total | | 0.04924 | | Total | | 0.04080 |

TABLE 2

| | (a) Vertically Arranged Type | | | | (b) Vertically Arranged Type | | | | (c) Vertically Arranged Type | | |
|---|---|---|---|---|---|---|---|---|---|---|---|
| | Diameter mm | Length mm | Volume cc | | Diameter mm | Length mm | Volume cc | | Diameter mm | Length mm | Volume cc |
| First passage portion | 1 | 2.2 | 0.00173 | First passage portion | 0.7 | 2.2 | 0.00085 | First passage portion | 0.5 | 2.2 | 0.00043 |
| Second passage portion | 1 | 20.6 | 0.01618 | Second passage portion | 0.7 | 20.6 | 0.00793 | Second passage portion | 0.5 | 20.6 | 0.00404 |
| Third passage portion | 1 | 9.1 | 0.00715 | Third passage portion | 0.7 | 9.1 | 0.00350 | Third passage portion | 0.5 | 9.1 | 0.00179 |
| Pressure sensor | 8 mmφ | | 0.01614 | Pressure sensor | 8 mmφ | | 0.01614 | Pressure sensor | 8 mmφ | | 0.01614 |
| | Total | | 0.04119 | | Total | | 0.02842 | | Total | | 0.02240 |

TABLE 3

| | (a) Opposingly arranged type | | | | (b) Opposingly arranged type | | | | (c) Opposingly arranged type | | |
|---|---|---|---|---|---|---|---|---|---|---|---|
| | Diameter mm | Length mm | Volume cc | | Diameter mm | Length mm | Volume cc | | Diameter mm | Length mm | Volume cc |
| Horizontal passage portion | 1 | 20.5 | 0.01610 | First passage portion | 0.7 | 20.5 | 0.00789 | First passage portion | 0.5 | 20.5 | 0.00403 |
| Vertical passage portion | 1 | 7.2 | 0.00565 | Second passage portion | 0.7 | 7.2 | 0.00277 | Second passage portion | 0.5 | 7.2 | 0.00141 |
| Pressure sensor | 8 mmφ | | 0.01614 | Pressure sensor | 8 mmφ | | 0.01614 | Pressure sensor | 8 mmφ | | 0.01614 |
| | Total | | 0.03789 | | Total | | 0.02680 | | Total | | 0.02158 |

Taking the volume of the conventional pressure-type flow controller (the first fluid passage 50, the second fluid passage 51, the third fluid passage 52, and the pressure sensing chamber of the pressure sensor 48) as 100%, the following Table 4 shows the volume of the pressure-type flow controller according to the first embodiment (the first passage portion 3a, the second passage portion 3b, the third passage portion 3c, the space surrounded by the pressure receiving chamber 33 of the pressure sensor 8, the pressure introducing hole 31a, and the inner peripheral surface of the gasket 36) and the volume of the pressure-type flow controller according to the second/third embodiment (the horizontal passage portion 3d, the vertical passage portion 3e, the space surrounded by the pressure receiving chamber 33 of the pressure sensor 8, the pressure introducing hole 31a, and the inner peripheral surface of the gasket 36).

TABLE 4

| | 1 mmφ | 0.7 mmφ | 0.5 mmφ |
|---|---|---|---|
| Conventional pressure-type flow controller | 100% | 73% | 61% |
| Pressure-type flow controller according to the first embodiment (Vertically arranged type) | 61% | 42% | 33% |
| Pressure-type flow controller according to the second embodiment (Opposingly arranged type) | 56% | 40% | 32% |

As clearly shown from Table 1 to Table 4, in the pressure-type flow controllers according to the first to third embodiments, the volume can be significantly reduced as compared with the conventional pressure-type flow controller. In particular, in the pressure-type flow controllers according to the second and third embodiments, the volume can be about half to ⅓ as compared with the conventional pressure-type flow controller.

Therefore, in the pressure-type flow controllers according to the first to third embodiments, the internal volume of the fluid passage 3 between the control valve for pressure control 5 and the orifice 7 provided on the upstream side of the on/off valve 6 can be made smaller than before, as a result, the shutoff characteristics can be improved.

Parenthetically, also in the pressure-type flow controller according to the fourth embodiment, the internal volume of the fluid passage 3 between the control valve for pressure control 5 and the orifice 7 provided on the upstream side of the on/off valve 6 can be made smaller than before, as a result, the shutoff characteristics can be improved.

INDUSTRIAL APPLICABILITY

The present invention can be applied to flow controllers not only for gas supply facilities or gas supply devices for semiconductor manufacturing devices, but also for any gas supply facilities in the chemical industry, the food industry, the pharmaceutical industry, and the like.

The invention claimed is:
1. A flow controller comprising:
   a main body provided with a fluid passage communicating between a fluid inlet and a fluid outlet;
   a control valve for pressure control fixed in a horizontal position to the main body for opening/closing the fluid passage;

an on/off valve fixed in a vertical position to the main body for opening/closing the fluid passage on the downstream side of the control valve for pressure control;
an orifice provided in the fluid passage on the upstream side of the on/off valve; and
a pressure sensor fixed to the main body for detecting the internal pressure of the fluid passage between the control valve for pressure control and the orifice,
the fluid passage including:
a first passage portion in a horizontal position connected to the control valve for pressure control;
a second passage portion in a vertical position connecting between the first passage portion and the orifice; and
a third passage portion in a horizontal position connecting between the second passage portion and the pressure sensor;
wherein the pressure sensor includes:
a casing;
a pressure introducing pipe provided to the casing protruding outward and forming a pressure introducing hole;
a pressure receiving chamber provided in the casing and communicating with the pressure introducing hole;
a diaphragm provided in the casing displacing in response to the pressure in the pressure receiving chamber;
a pressure detecting element provided in the casing for converting the pressure into an electrical signal based on the displacement of the diaphragm, and
a tip portion of the pressure introducing pipe is air-tightly attached to the main body to allow communication between the pressure introducing hole of the pressure introducing pipe and the third passage portion.

2. The flow controller according to claim 1, wherein the on/off valve and the orifice are formed as an orifice-built-in valve having the orifice integrally assembled and fixed in the on/off valve.

3. The flow controller according to claim 1, wherein
the control valve for pressure control includes a metal diaphragm valve body,
the metal diaphragm valve body is located under the on/off valve,
a central portion of the metal diaphragm valve body comes into or out of contact with a valve seat formed in the main body, and
the first passage portion is formed at a central position of the valve seat.

4. The flow controller according to claim 1, wherein cross-sectional shapes of the first passage portion, the second passage portion, and the third passage portion are each a circular shape having an inner diameter of 0.5 mm to 1.0 mm.

5. A flow controller comprising:
a main body provided with a fluid passage communicating between a fluid inlet and a fluid outlet;
a control valve for pressure control fixed in a horizontal position to the main body for opening/closing the fluid passage;
an on/off valve fixed to the main body to be opposed to the control valve for pressure control for opening/closing the fluid passage on the downstream side of the control valve for pressure control;
an orifice provided in the fluid passage on the upstream side of the on/off valve; and
a pressure sensor fixed to the main body for detecting the internal pressure of the fluid passage between the control valve for pressure control and the orifice,
the fluid passage including:
a horizontal passage portion connecting between the control valve for pressure control and the orifice; and
a vertical passage portion connecting between the horizontal passage portion and the pressure sensor;
wherein the pressure sensor includes:
a casing;
a pressure introducing pipe provided to the casing protruding outward and forming a pressure introducing hole;
a pressure receiving chamber provided in the casing and communicating with the pressure introducing hole;
a diaphragm provided in the casing displacing in response to the pressure in the pressure receiving chamber;
a pressure detecting element provided in the casing for converting the pressure into an electrical signal based on the displacement of the diaphragm, and
a tip portion of the pressure introduction pipe is air-tightly attached to the main body to allow for communication between the pressure introducing hole of the pressure introducing pipe and the vertical passage portion.

6. The flow controller according to claim 5, wherein
the control valve for pressure control includes a metal diaphragm valve body,
a central portion of the metal diaphragm valve body comes into or out of contact with a valve seat formed in the main body, and
the horizontal passage portion is formed at a central position of the valve seat.

7. The flow controller according to claim 5, wherein cross-sectional shapes of the horizontal passage portion and the vertical passage portion are each a circular shape having an inner diameter of 0.5 mm to 1.0 mm.

8. The flow controller according to claim 5, wherein the fluid inlet and the fluid outlet are formed on a same surface of the main body such that the fluid inlet and the fluid outlet are arranged in one direction on the main body.

9. The flow controller according to claim 5, wherein the on/off valve and the orifice are formed as an orifice-built-in valve having the orifice integrally assembled and fixed in the on/off valve.

10. A flow controller comprising:
a main body provided with a fluid passage communicating between a fluid inlet and a fluid outlet;
a control valve for pressure control fixed in a horizontal position to the main body for opening/closing the fluid passage;
an on/off valve fixed to the main body to be opposed to the control valve for pressure control for opening/closing the fluid passage on the downstream side of the control valve for pressure control;
an orifice provided in the fluid passage on the upstream side of the on/off valve; and
a pressure sensor fixed to the main body for detecting the internal pressure of the fluid passage between the control valve for pressure control and the orifice,
the fluid passage including:
a first passage portion connecting between the control valve for pressure control and a pressure sensing chamber on a pressure sensing surface of the pressure sensor; and
a second passage portion spaced from the first passage portion and connecting between the pressure sensing chamber and the orifice;
wherein the pressure sensor is inserted and fixed into an insertion hole formed in the main body through a ring gasket, the pressure sensing chamber on the pressure sensing surface of the pressure sensor is defined by a space surrounded by an inner bottom surface of the insertion hole, the ring gasket, and the pressure sensing surface of the pressure sensor, the first passage portion is connected to an end portion of the pressure sensing chamber on the control valve for pressure control side, and the second passage portion is connected to an end portion of the pressure sensing chamber on the on/off valve side.

11. The pressure type flow controller according to claim 10, wherein the control valve for pressure control includes a metal diaphragm valve body, a central portion of the metal diaphragm valve body comes into or out of contact with a valve seat formed in the main body, and the first passage portion is formed at a central position of the valve seat.

12. The flow controller according to claim 10, wherein cross-sectional shapes of the first passage portion and the second passage portion are each a circular shape having an inner diameter of 0.5 mm to 1.0 mm.

13. The flow controller according to claim 10, wherein the on/off valve and the orifice are formed as an orifice-built-in valve having the orifice integrally assembled and fixed in the on/off valve.

14. The flow controller according to claim 10, wherein the fluid inlet and the fluid outlet are formed on a same surface of the main body such that the fluid inlet and the fluid outlet are arranged in one direction on the main body.

* * * * *